(12) United States Patent
Zellner et al.

(10) Patent No.: US 6,481,294 B2
(45) Date of Patent: Nov. 19, 2002

(54) SENSOR ARRAY FOR A CAPACITANCE MEASURING FINGERPRINT SENSOR, AND METHOD FOR PRODUCING SUCH A SENSOR ARRAY

(75) Inventors: Maximilian Zellner, Röhrmoos (DE); Jörg Zapf, München (DE); Peter Demmer, München (DE)

(73) Assignee: Infineon Technologies AG, München (DE)

( * ) Notice: Subject to any disclaimer, the term of this patent is extended or adjusted under 35 U.S.C. 154(b) by 0 days.

(21) Appl. No.: 09/796,214

(22) Filed: Feb. 28, 2001

(65) Prior Publication Data
US 2001/0028253 A1 Oct. 11, 2001

Related U.S. Application Data

(63) Continuation of application No. PCT/DE99/02695, filed on Aug. 27, 1999.

(30) Foreign Application Priority Data

Aug. 31, 1998 (DE) .......................................... 198 39 642

(51) Int. Cl.⁷ ................................................ G01D 7/00
(52) U.S. Cl. ................................................ 73/862.046
(58) Field of Search .......................... 73/780, 862.046, 73/862.041, 862.042, 862.043, 862.044, 862.045, 862.68

(56) References Cited

U.S. PATENT DOCUMENTS

| 5,286,335 | A | | 2/1994 | Drabik et al. |
| 6,055,324 | A | * | 4/2000 | Fujieda ........................ 382/124 |
| 6,088,471 | A | * | 7/2000 | Setlak et al. ................. 382/116 |
| 6,234,031 | B1 | * | 5/2001 | Suga ..................... 73/862.474 |
| 6,256,022 | B1 | * | 7/2001 | Manaresi et al. ........ 178/18.06 |
| 6,362,633 | B1 | * | 3/2002 | Tartagni ..................... 324/661 |

FOREIGN PATENT DOCUMENTS

| EP | 0 459 808 A2 | 12/1991 |
| FR | 2 736 179 A1 | 1/1997 |
| WO | WO 98/11500 | 3/1998 |
| WO | WO 00/13129 | 3/2000 |

* cited by examiner

*Primary Examiner*—Max Noori
(74) *Attorney, Agent, or Firm*—Laurence A. Greenberg; Werner H. Stemer; Ralph E. Locher

(57) ABSTRACT

A base layer, which is preferably flexible, has first conductor tracks, a first insulation layer, fine structures with first electrodes, second conductor tracks and second electrodes, and finally a second insulation layer applied to it in succession. The first electrodes are connected, via plated-through holes, to associated first conductor tracks. Changes, caused by lines in the skin of a finger pad, in the stray capacitance between adjacent first and second electrodes are evaluated for recording fingerprints.

9 Claims, 3 Drawing Sheets

SENSOR ARRAY FOR A CAPACITANCE MEASURING FINGERPRINT SENSOR, AND METHOD FOR PRODUCING SUCH A SENSOR ARRAY

CROSS-REFERENCE TO RELATED APPLICATION

This application is a continuation of copending International Application No. PCT/DE99/02695, filed Aug. 27, 1999, which designated the United States.

BACKGROUND OF THE INVENTION

FIELD OF THE INVENTION

Fingerprints make it possible to reliably establish the identity of persons. Fingerprint sensors are therefore used to identify people authorized to use credit cards, other types of smart cards, passes and the like. European Patent EP 0 459 808 B1 discloses an example of such a fingerprint sensor which has a matrix of pressure-sensitive cells and triggers switching operations that are based on the lines in the skin of the finger tips or pads. These switching operations are then used for identification by evaluation electronics. In addition, capacitance measuring fingerprint sensors already exist, in which the sensor array records differences in capacitance between finger pad regions which are in contact and those which are not in contact with the sensor. These differences in capacitance then allow reliable identification by evaluation electronics.

For reliably recording fingerprints, the sensor array in a capacitance measuring fingerprint sensor should have a minimum size of approximately 13×13 mm, and when used in smart cards, the array should also have a certain degree of flexibility. On the other hand, since structure fineness of less than 100 $\mu$m is required for such sensor arrays, the corresponding structures are produced on silicon using thin film technology. In this case, such sensor arrays can be made flexible, within certain limits, by grinding down the silicon support, which is cost intensive.

SUMMARY OF THE INVENTION

It is accordingly an object of the invention to provide a sensor array for a capacitance measuring fingerprint sensor and a method of producing the sensor array which overcomes the above-mentioned disadvantageous of the prior art apparatus and methods of this general type. In particular, it is an object of the invention to provide a sensor array that has a simple design and that can be produced using economical thin film technology.

With the foregoing and other objects in view there is provided, in accordance with the invention, a sensor array for a capacitance measuring fingerprint sensor. The sensor array includes: a base layer made of an electrically insulating material; a plurality of first conductor tracks configured on the base layer; and a first insulation layer made of an electrically insulating material disposed on top of the base layer and the plurality of the first conductor tracks. The first insulation layer has a plurality of plated-through holes formed therein and on top of associated ones of the plurality of the first conductor tracks that are situated underneath. The sensor array also includes: a plurality of first electrodes configured on the first insulation layer and electrically conductively connected to the associated ones of the plurality of the first conductor tracks by the plurality of the plated-through holes; a plurality of second conductor tracks configured on the first insulation layer and crossing the plurality of the first conductor tracks; a plurality of second electrodes configured on the first insulation layer and electrically conductively connected to associated ones of the plurality of the second conductor tracks; and a second insulation layer disposed on the first insulation layer, the plurality of the first electrodes, the plurality of the second conductor tracks, and on the plurality of the second electrodes.

The inventive sensor array permits a simple and reliable measurement principle in which the change in the stray capacitance between two adjacent electrodes as a result of the grooves in the finger skin which are in contact is measured. In this context, the sensor array can be produced using thin film technology on a rigid substrate, or in the form of a flexible fine structure suitable for use in smart cards. The latter option is made possible by the invention's method for producing a sensor array. This method is based on recognition of the fact that the disadvantages associated with processing flexible support materials can be avoided if a thin base layer made of a flexible organic material can first be applied to a rigid auxiliary support and can be removed from the auxiliary support again once the metal fine structures of the sensor array have been produced, without the risk of damage. Such careful removal of the base layer can be carried out by laser ablation from the back of the auxiliary support, provided that the auxiliary support is made of a material which is at least largely permeable to the laser radiation used. Whereas the conventional production of flexible wiring systems allows only structure dimensions of above 100 $\mu$m to be provided, the temporary use of the rigid auxiliary support in this case makes structure finenesses of much less than 100 $\mu$m possible.

In accordance with an added feature of the invention, the sensor array is produced on a base layer made of economical organic material.

In accordance with an additional feature of the invention, the sensor array is produced on a base layer made of flexible organic material. Then the sensor array can be used in smart cards or the like without the risk of breakage.

In accordance with another feature of the invention, the base layer is made of a film of a thermostable polyimide. This permits the finished sensor array to be used without any difficulty even at increased ambient temperature.

In accordance with a further feature of the invention, a planar layer made of an electrically insulating material is applied to the base layer. The film can then be provided with a very high surface quality which permits the finest metal structures to be formed.

With the foregoing and other objects in view there is provided, in accordance with the invention, a method for producing a sensor array for a capacitance measuring fingerprint sensor, that includes steps of: providing a rigid auxiliary support made from a material that is at least largely permeable to a given type of laser radiation; applying a thin base layer made of a flexible organic material on the auxiliary support; configuring a plurality of first conductor tracks on the base layer; applying a first insulation layer to the base layer and the plurality of the first conductor tracks; producing holes in the insulation layer; forming, on the first insulation layer, a plurality of first electrodes, a plurality of second conductor tracks crossing the plurality of the first conductor tracks, and a plurality of second electrodes that are electrically conductively connected to associated ones of the plurality of the second conductor tracks; electrically conductively connecting the plurality of the first electrodes to associated ones of the plurality of the first conductor tracks that are situated underneath by providing a metal coating in the holes in the insulation layer; applying a second insulation layer to the first insulation layer, the plurality of the first electrodes, the plurality of the second conductor tracks and the plurality of the second electrodes; and directing the laser radiation of the given type through the auxiliary support onto the base layer to remove the base layer.

In accordance with an added mode of the invention, a quartz glass is used as the material from which the auxiliary support is made; and the laser radiation of the given type is provided from an excimer laser having a laser radiation wavelength of 248 nm. This permits the auxiliary support to have a permeability to laser radiation of approximately 90%.

In accordance with an additional mode of the invention, borosilicate glass is used as the quartz glass for the auxiliary support; and the laser radiation of the given type is provided from an excimer laser having a laser radiation wavelength of 350 nm. This likewise permits the auxiliary support to have a permeability to laser radiation of approximately 90%, but in this case enables the auxiliary support made of borosilicate glass, to be provided at a relatively low cost.

In accordance with another mode of the invention, an adhesive layer is applied to the auxiliary support before the base layer is applied to the auxiliary support. This provides improved adhesion of the base layer to the auxiliary support during processing of the structure.

In accordance with a further mode of the invention, the adhesive layer is made of titanium, which is permeable to the laser radiation when the base layer is removed.

In accordance with a further added mode of the invention, the adhesive layer is applied to the auxiliary support with an extremely low layer thickness by sputtering.

In accordance with a concomitant mode of the invention, the base layer is applied as a film. Thus, the base layer can be applied to the auxiliary support in an extremely simple and economical manner.

Other features which are considered as characteristic for the invention are set forth in the appended claims.

Although the invention is illustrated and described herein as embodied in a sensor array for a capacitance measuring fingerprint sensor, and method for producing such a sensor array, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
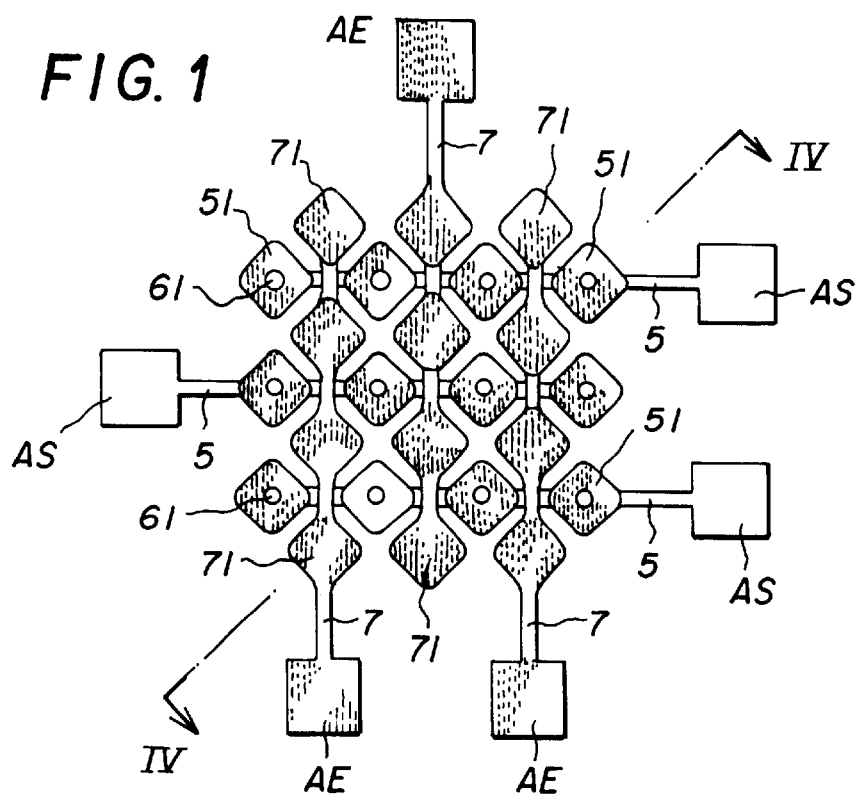
FIG. 1 shows a plan view of a highly simplified schematic illustration of a sensor array in a capacitance measuring fingerprint sensor.

Referring now to the figures of the drawing in detail and first, particularly, to FIG. 1 thereof, there is shown a highly simplified schematic illustration of a partial plan view of a sensor array in a sensor configuration for recording fingerprints. The multilayer structure of the sensor array can be seen in FIG. 4 which shows a sectional view taken along the line IV—IV shown in FIG. 1. To permit a better overview, the individual layers of the multilayer structure are shown in an exploded state in FIG. 4.

Figure 4:
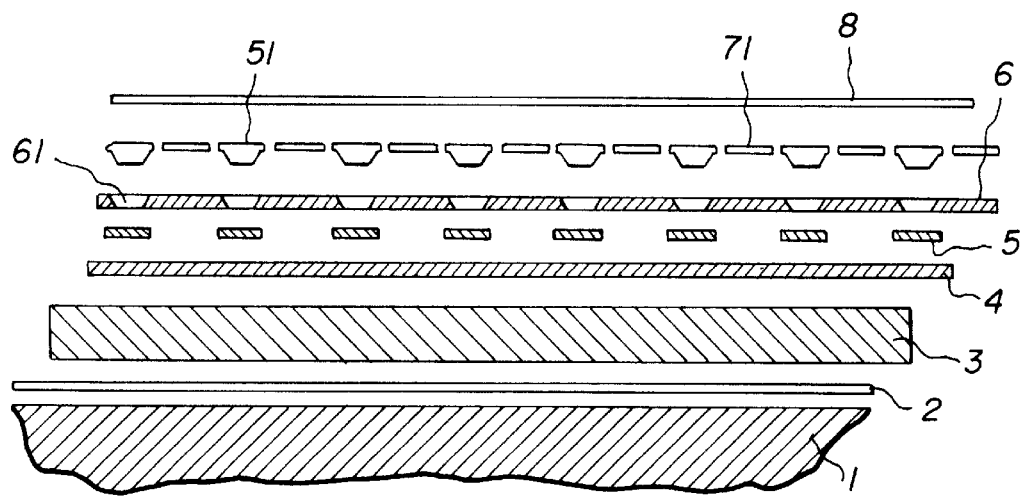
FIG. 4 is a sectional view taken along line IV—IV in FIG. 1.

Production of the sensor array shown in FIGS. 1 and 4 starts with a rigid auxiliary support 1 made of borosilicate glass. To ensure reliable adhesion of the subsequent structure on the auxiliary support 1, an adhesive layer 2 made of titanium is applied by sputtering. A base layer 3 is then applied to this adhesive layer 2. In the illustrative embodiment shown, this base layer 3 is a film made of a thermostable polyimide which has a thickness of 50 $\mu$m and is applied by lamination. The base layer 3 is then planarized by spin-coating with an insulation material. This operation is shown in FIG. 4 by planar layer 4 (shown separately).

The subsequent production of metal fine structures in the form of a set of first conductor tracks 5 can, in principle, be carried out using subtractive technology, additive technology or semi-additive technology. In the illustrative embodiment shown, the first conductor tracks 5 are produced semi-additively. In this case, the planar layer 4 is sputtered over the whole surface thereof with a layer sequence including titanium and palladium. A photoresist (not shown in the drawing) is applied to it, and it is structured such that gold can be deposited onto the freely developed conductor track pattern electrochemically, for example. As another example, copper can be deposited electrochemically or chemically. When the photoresist has been stripped, those regions of the titanium and palladium layer sequence which do not correspond to the desired first conductor tracks 5 can be removed by selective etching down to the surface of the planar layer 4.

A photographically structurable first insulation layer 6 is then applied to the first conductor tracks 5, and holes 61 having a diameter of 25 $\mu$m, for example, are made in the insulation layer 6 by exposure and development. Subsequently a second layer of metal fine structures in the form of first electrodes 51, second conductor tracks 7 and second electrodes 71 (See FIGS. 1 and 4 and the discussion below) are produced. Plated-through holes are also produced in the region of the holes 61. The plated-through holes electrically conductively connect the first electrodes 51 to associated first conductor tracks 5 situated underneath. The aforementioned second layer of metal fine structures is produced semi-additively in the shown exemplary embodiment.

The schematic illustration shown in FIG. 1 shows that the set of first conductor tracks 5 and the set of second conductor tracks 7 cross one another orthogonally. It is also possible to see that the second electrodes 71 are formed by planar widened portions of the second conductor tracks 7 and that the first electrodes 51 and the second electrodes 71 form a kind of pixel array whose pixel grid spacing is 70 $\mu$m in the illustrative embodiment shown. The ends of the first conductor tracks 5 lead to connections for transmission lines AS, while the ends of the second conductor tracks 7 lead to connections for reception lines AE. The connections AS and AE are then used to connect the sensor array to evaluation electronics.

FIG. 4 also shows that a second insulation layer 8 is finally applied to the second layer of metal fine structures.

The second insulation layer 8 serves not only for electrically insulating the first and second electrodes 51 and 71 but also serves as a passivation layer, and, for example, can be made of $BaTiO_3$, $Al_2O_3$ or $SiO_3$. Following electrical and visual checking, the multilayer structure including a plurality of cohesive individual configurations is separated, down to the adhesive layer 2, into individual sensor arrays, which, for example can be performed using an Nd:YAG laser. These individual sensor arrays, as already mentioned, should have a minimum size of approximately 13×13 mm. The layer structure is now ablated from the auxiliary support using an excimer laser operated with XeF (wavelength 350 nm).

Figure 6:
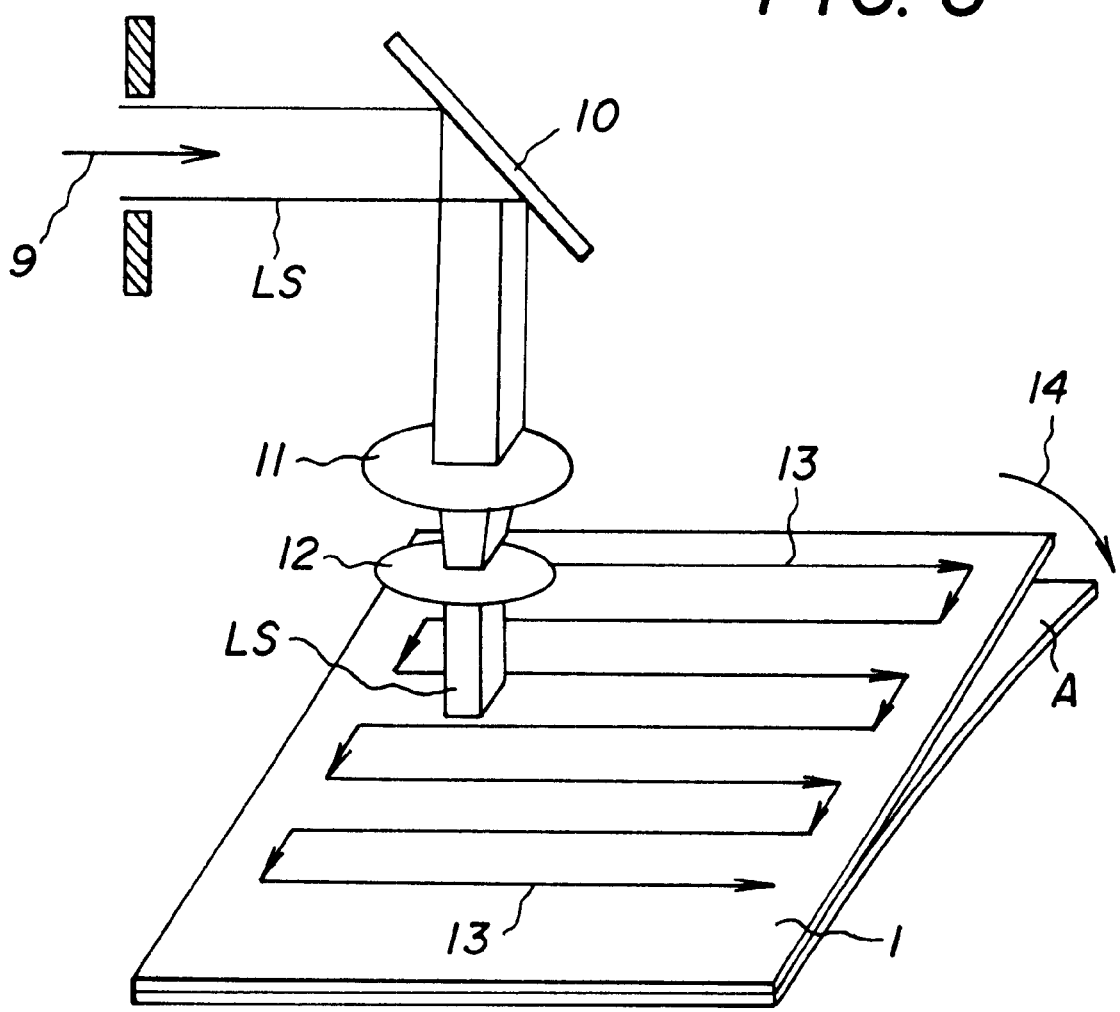
FIG. 6 shows a configuration for removing the multilayer structure shown in FIG. 4 from the auxiliary support.

The aforementioned laser ablation is performed using a configuration which is shown schematically in FIG. 6. In this context, the laser radiation LS from the excimer laser is pointed in the direction of the arrow 9 toward a deflecting mirror 10 and is deflected onto the surface of the auxiliary support 1 by means of telecentric imaging lenses 11 and 12. The auxiliary support 1 and the structure A including layers 3 to 8 (cf. FIG. 4) are configured on an XY table (not shown in FIG. 6), which permits scanning with a relative movement between the laser radiation LS, whose beam profile is rectangular, and the auxiliary support 1. This scanning movement is indicated by arrows 13 in FIG. 6.

The action of the laser radiation LS at least largely neutralizes the adhesive effect between the adhesive layer 2 and the base layer 3 in a cold operation, so that the structure A can be removed, as indicated by the arrow 14 in FIG. 6. If the base layer 3 has been applied to the adhesive layer 2 using an adhesive, then the laser beam LS neutralizes the effect of this adhesive in a comparable manner.

The auxiliary support 1 with the adhesive layer 2 (cf. FIG. 4) can be reused after cleaning.

Figure 2:
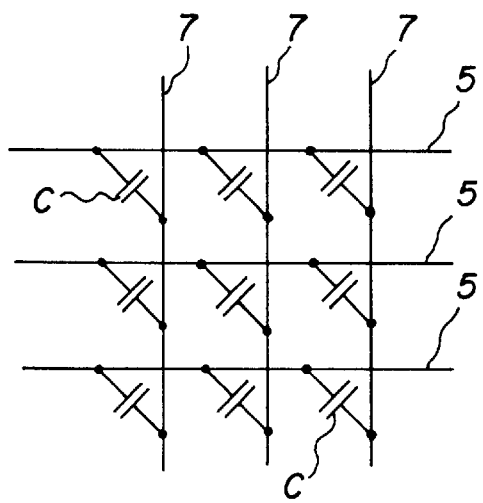
FIG. 2 shows the equivalent circuit diagram for the sensor array shown in FIG. 1.

FIG. 2 shows an equivalent circuit diagram for the sensor array shown schematically in FIG. 1. Respective capacitances C are formed between the first conductor tracks 5 and the orthogonally crossing second conductor tracks 6. These capacitances C are stray capacitances between adjacent first electrodes 51 and second electrodes 71 (cf. FIG. 1). In the illustrative embodiment outlined, C is <10 fF.

Figure 3:
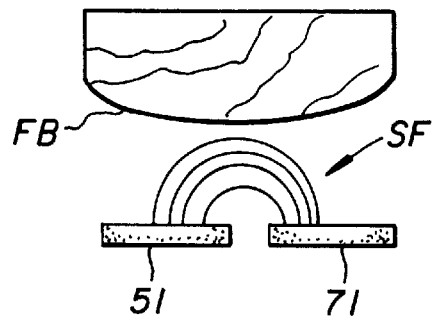
FIG. 3 illustrates the measurement principle of the sensor array shown in FIG. 1.

In the sensor array outlined, which could also be called a passive sensor array, the stray field between adjacent first electrodes 51 and second electrodes 71 is now used as a measured variable for recording fingerprints. This principle, which is also called the fringing field measurement principle, can be seen in FIG. 3. In this case, the stray field between a first electrode 51 and an adjacent second electrode 71 is denoted by SF. The finger pad FB (which can be seen above this) of a person who is to be identified now modifies the stray field SF based on the respective pattern of lines in the skin.

Figure 5:
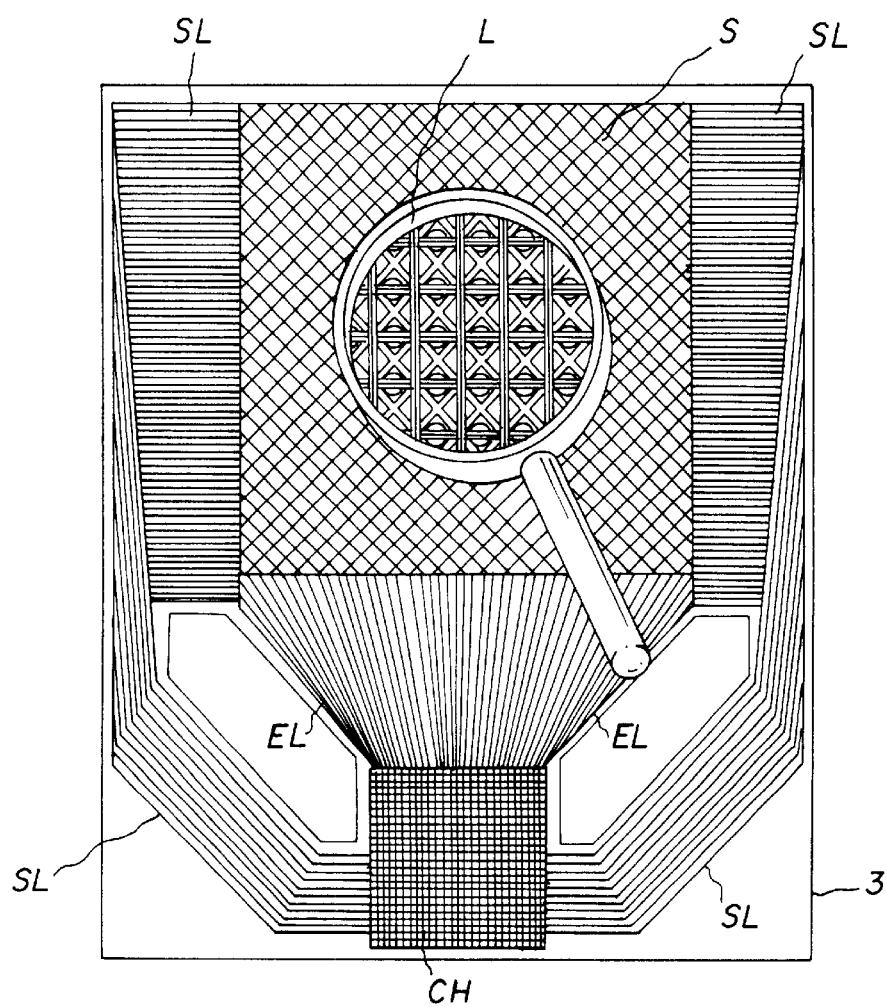
FIG. 5 is a plan view of a finished fingerprint sensor.

FIG. 5 shows a plan view of a finished fingerprint sensor in which the sensor array is denoted by S. In the region of a magnifying glass L, it is possible to see that the structure of the sensor array F corresponds to the structure of the sensor array which is shown schematically in FIG. 1. On the base layer 3, the two sides of the sensor array S have transmission lines SL routed to a chip CH configured below the sensor array S. This chip CH is the evaluation electronics of the fingerprint sensor. Starting from the bottom edge of the sensor array S, reception lines EL are routed to the chip CH.

The transmission lines SL are used to supply square wave pulses, for example, to the first electrodes 51 (cf. FIG. 1) of the passive sensor array S, while the reception lines EL record the change in the stray field SF between the first and second electrodes 51 and 71 (cf. FIG. 3) which is caused by the finger pad FB, and thereby permit the chip CH to identify the person in question.

The fingerprint sensor shown in FIG. 5 dispenses with the connections AS and AE shown in FIG. 1. The transmission lines SL are in the form of continuations of the first conductor tracks 5 on the base layer 3. Accordingly, the reception lines EL are in the form of continuations of the second conductor tracks 7 on the first insulation layer 6.

We claim:

1. A sensor array for a capacitance measuring fingerprint sensor, comprising:

a base layer made of an electrically insulating material;

a plurality of first conductor tracks configured on said base layer;

a first insulation layer made of an electrically insulating material disposed on top of said base layer and said plurality of said first conductor tracks, said first insulation layer having a plurality of plated-through holes formed therein and on top of associated ones of said plurality of said first conductor tracks situated underneath;

a plurality of first electrodes configured on said first insulation layer and electrically conductively connected to said associated ones of said plurality of said first conductor tracks by said plurality of said plated-through holes;

a plurality of second conductor tracks configured on said first insulation layer and crossing said plurality of said first conductor tracks;

a plurality of second electrodes configured on said first insulation layer and electrically conductively connected to associated ones of said plurality of said second conductor tracks; and a second insulation layer disposed on said first insulation layer, said plurality of said first electrodes, said plurality of said second conductor tracks, and said plurality of said second electrodes.

2. The sensor array according to claim 1, wherein said electrically insulating material of said base layer is an organic material.

3. The sensor array according to claim 1, wherein said electrically insulating material of said base layer is a flexible organic material.

4. The sensor array according to claim 3, wherein said base layer is a film.

5. The sensor array according to claim 4, wherein said film is a thermostable polyimide.

6. The sensor array according to claim 4, comprising a planar layer made of an electrically insulating material disposed on said base layer.

7. The sensor array according to claim 1, wherein said plurality of plated-through holes are metallized holes.

8. The sensor array according to claim 1, wherein said plurality of second conductor tracks orthogonally cross said plurality of said first conductor tracks.

9. The sensor array according to claim 1, wherein said plurality of said second conductor tracks include first portions and second portions that are wider than said first portions, said second portions being planar and forming said plurality of said second electrodes.

* * * * *